United States Patent [19]
Baxter

[11] 3,724,536
[45] Apr. 3, 1973

[54] HEATING AND COOLING DEVICE
[75] Inventor: Brent Baxter, Salt Lake City, Utah
[73] Assignee: General Instrument Corporation, Newark, N.J.
[22] Filed: Aug. 14, 1970
[21] Appl. No.: 63,831

[52] U.S. Cl. ...................165/27, 165/80, 165/185
[51] Int. Cl. .............................................F25b 29/00
[58] Field of Search.........165/26, 27, 48, 80, 86, 185

[56] References Cited
UNITED STATES PATENTS
3,143,167  8/1964  Vieth.....................................165/27

*Primary Examiner*—Charles Sukalo
*Attorney*—James and Franklin

[57] ABSTRACT

An apparatus is provided which applies heat and cold to a device such as a semiconductor under test. A supporting structure is movable toward and away from the device under test and carries a housing which encloses a heat conductive member having a part which is engageable with the tested device. The housing also carries a heating means and a cooling means, both in heat transfer relation with said heat conductive member. One or the other of the heating and cooling means is rendered operative at a given time. Temperature sensing means monitors the temperature of the conductive member and transmits an appropriate signal to control means. The control means, in response thereto, causes more or less heat, or more or less cold, as the case may be, to be applied to the device under test.

19 Claims, 3 Drawing Figures

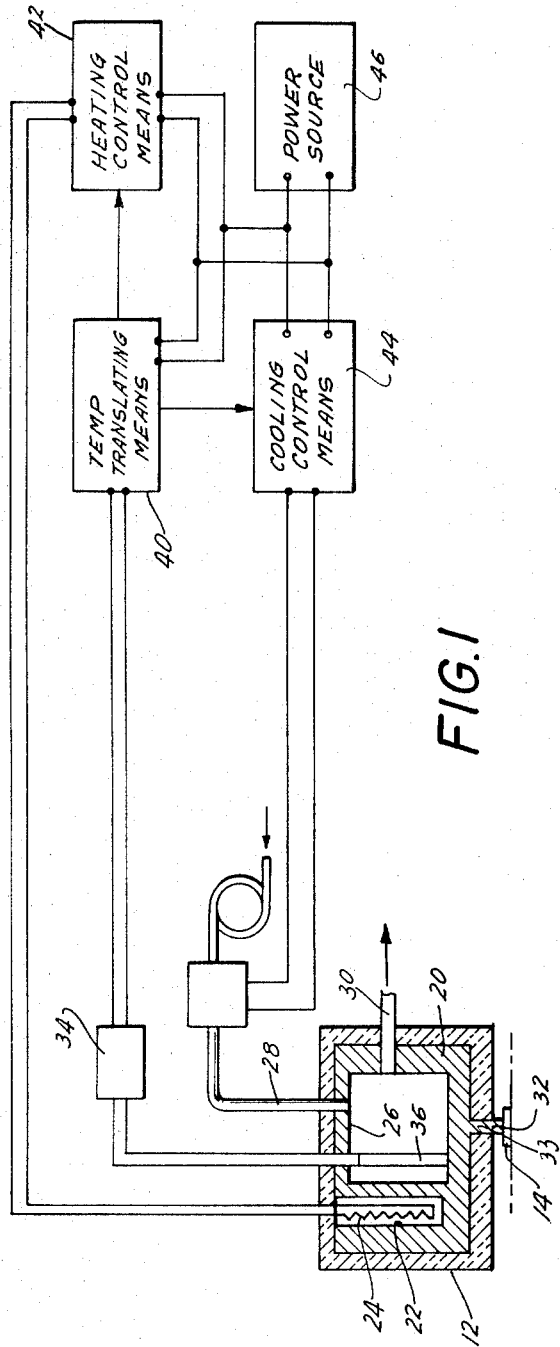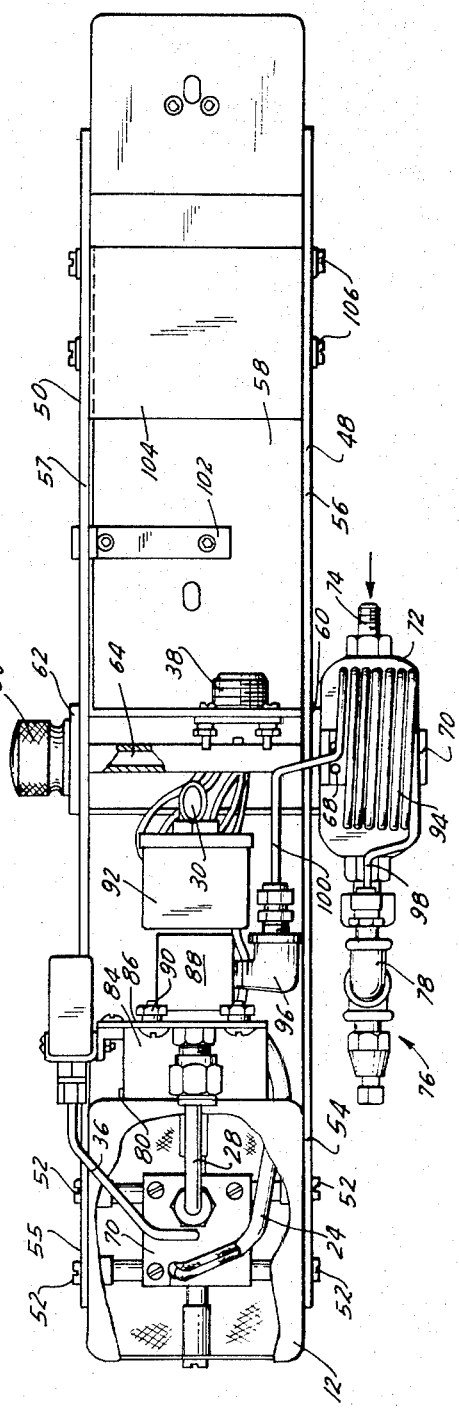

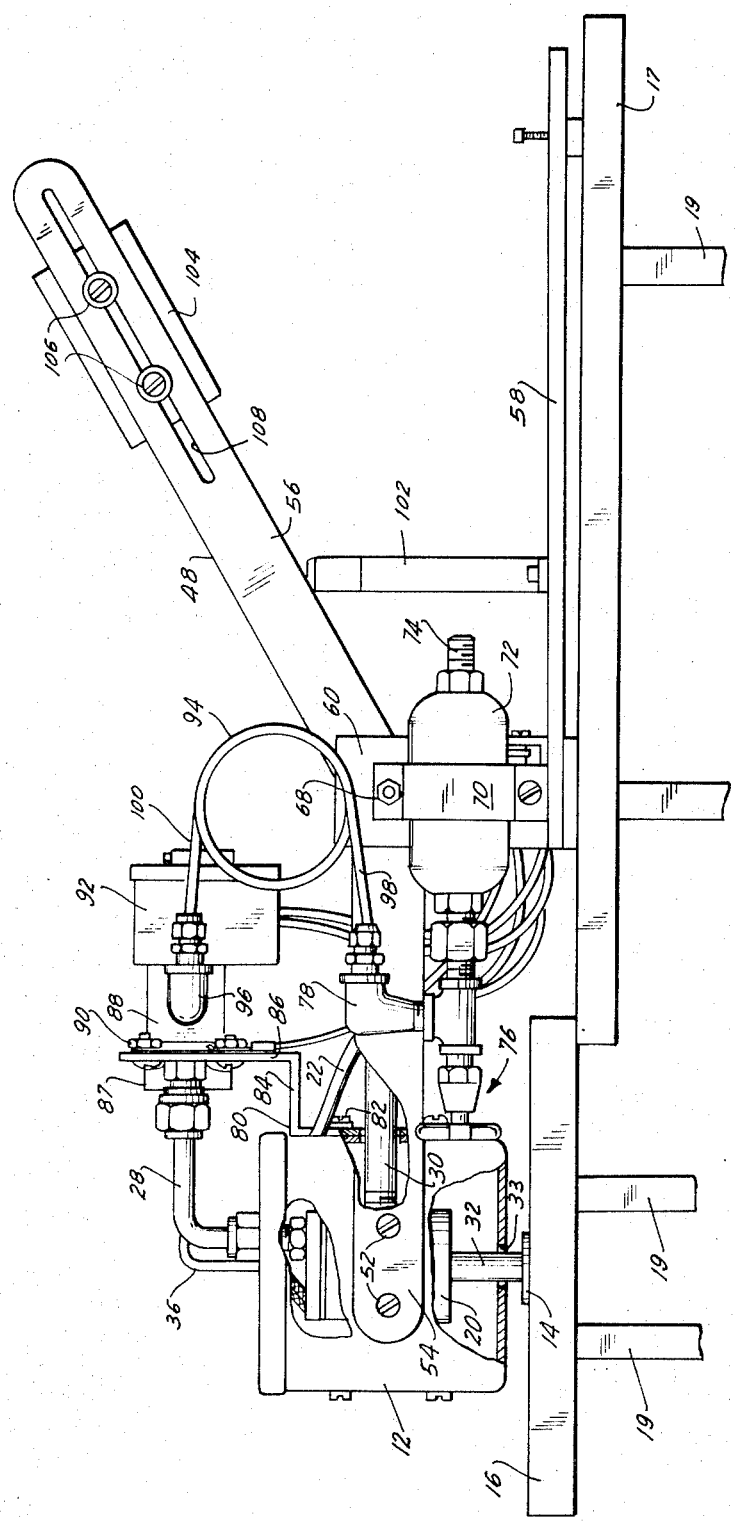

HEATING AND COOLING DEVICE

The present invention relates to an apparatus adapted to apply heat or cold to a device under test.

It has been found necessary to test certain devices, notably electronic elements such as semiconductors, when subjected to varying degrees of heat and cold. Semiconductors are in many cases exposed to extremes of heat and cold, and hence reliable performance under such different temperature conditions is critically important.

Accordingly, it has become necessary to develop an apparatus capable of applying controllable degrees of heat and cold for testing purposes, and which is simple and convenient for use with large numbers of such devices.

With the advent of integrated circuits the testing problem has become aggravated. Each integrated circuit chip contains a very large number of electrical devices. The chips are subjected to many different electrical tests, both static and dynamic. These tests are performed very rapidly, often through the use of computerized equipment. If each sequence of tests is to be carried out at a plurality of temperatures, as is desirable, means must be provided for placing the test chip at the desired temperatures, and shifting from one temperature to another rapidly and effectively. Moreover, test space is usually at a premium, and hence it is desirable that the temperature-controlling equipment be as small and compact as possible, preferably being adaptable for use in a pre-existing test table. In addition, it should be very easily manipulatable, so that test chips can be shifted quickly into and out of test position. The present invention, therefore, applies desired heat and cold to a device under test by means of a heat conductive element which is in operative heat transfer relation with controlled heating and cooling means, and which is adapted to be moved into and out of engagement with the device under test.

It is a primary object of the present invention to provide a compact and effective apparatus for applying heat and cold to a degice under test.

A further object of the present invention is to provide an apparatus for applying heat and cold to a device under test which is capable of automatically achieving and maintaining the temperatures desired.

Another object of the present invention is to provide an apparatus for applying heat and cold to a device under test which is simple and convenient to use, is adaptable for repetitive testing, and affects the carrying out of electrical tests only to a minimal degree, if at all.

An additional object of the present invention is to provide a temperature-producing apparatus which utilizes a single heat conductive element engageable with the device under test which is capable, as desired, of adding heat to or removing heat from said test device.

Still another object of the present invention is to provide an apparatus for applying heat and cold to a device under test in which the engaging pressure exerted on the tested device is variably controlled.

In accordance with the present invention, a housing encloses a heat conductive element. That housing is movably supported so as to be adapted to move toward and away from a device under test. A compartment and an expansion chamber are provided in that element. Heating means, such as a heating coil, is received in the compartment, and is in heat transfer relation with the heat conductive element, and when energized, heats that conductive element. Cooling means, in operative connection with the expansion chamber, comprises fluid metering means which regulates the amount of fluid coolant entering that expansion chamber. Upon admission to the expansion chamber the fluid coolant undergoes a rapid expansion, thereby cooling the conductive element and consequently the device under test. Control means is operatively connected to the heating and cooling means and renders one or the other operative, depending on whether the device is to be heated or cooled. Heat sensing means, such as a thermocouple, is in heat transfer relation with the conductive element and monitors its temperature. The control means, in response to a signal received from the heat sensing means, regulates the heating and cooling means, thereby to selectively and controllably heat or cool the device to be tested. A counterweight, suspended from an arm, controls the force with which the conductive element engages the tested device.

To the accomplishment of the above, and to such other objects as may hereinafter appear, the present invention relates to an apparatus for applying heat and cold to a device under test as defined in the appended claims, and as described in the specification taken together with the accompanying drawings in which:

FIG. 1 is a schematic representation of the heat transfer systems of the instant invention, and represents schematically their connections to an illustrative external control panel;

FIG. 2 is a partially cut away, top plan view of a preferred embodiment of the present invention; and FIG. 3 is a partially cut away side elevational view of the apparatus illustrated in FIG. 2.

Referring to FIG. 3, 16 represents a test platform table having a test station where a test device 14, such as an integrated circuit chip, may be placed. The device 14 is exposed, and hence is accessible for visual inspection and electrical connection to appropriate testing equipment. The heating and cooling device of the present invention may be mounted on that table 16 itself or, as here specifically disclosed, on an extension 17 thereof. Both the table 16 and extension 17 are supported in any appropriate manner, as by legs 19.

As shown semi-schematically in FIG. 1, the heating and cooling device of the present invention comprises a housing 12, which may be formed in whole or in part of heat-insulative material, encloses a heat conductive member or block 20. That block defines a compartment 22, which compartment receives therein heating means in the nature of a heating coil 24. That heating coil 24 transfers more or less heat, depending upon the amount of current passing therethrough, to the conductive block 20, which in turn transfers the heat to the test device 14, as will be hereinafter described. The block 20 also devines an expansion chamber 26; the tubing 28 admits fluid coolant, for example liquid carbon dioxide, into that expansion chamber, which coolant undergoes an immediate expansion resulting in a cooling of block 20, this in turn removing heat from and hence cooling the device 14 under test, and thereafter the expanded carbon dioxide is discharged from the chamber 26 through the exhaust conduit 30. A heat conductive applicator 32, preferably integral with the block 20, extends through an opening 33 in the housing 12 and is engageable with the test device 14. Both heat or cold, depending upon the conditions of the test, is transferred from the block 20 to the applicator 32 which, in turn, heats or cools that tested device to the appropriate temperature, for example, within the range of −50° to +125°C. During this heating or cooling the appropriate electrical tests may be performed.

A heat sensing means, such as a thermocouple 34 is in heat transfer relation with the heat applicator 32 by means of heat transfer member 36 and monitors the temperature of that block. The resultant electrical signal derived from that thermocouple is transmitted to an external control panel (not shown) by means of the adaptor 38 (FIG. 2) and appropriate electrical conductors. A representative control panel may contain the elements schematically shown in FIG. 1. The signal from the heat sensing means 34 is conducted to a temperature translating means 40. The latter means may be preset to maintain a given temperature, and therefore activates either a heating control means 42 or a cooling control means 44, as desired, to draw an appropriate current from the power source 46. If the device 14 is to be heated the heating control means 42 will be activated and an appropriate current will pass through the heating element 24 to produce the desired temperature. On the other hand, if a cooling temperature is desired the cooling control means 44 will be actuated and fluid coolant at an appropriate rate will be admitted to the expansion chamber 26.

The housing 12 must be mounted for pivoted movement toward and away from the test device 14. Accordingly, the arms 48,50 pivotally support the housing 12 (by means of screws 52) and comprise horizontal sections 54, 55 and angularly upwardly disposed sections 56, 57. The arms 48, 50 are themselves pivotally mounted on a base 58 by means of the upstanding members 60, 62. The cross shaft 64 defining the pivotal axis extends through sleeve 66 which is connected to arms 48, 50 and has a threaded end received in a nut 68. The arms 48, 50 are therefore pivotable about the cross shaft 64 and consequently move the housing 12 toward or away from the test device 14. A knob 69 attached to the cross shaft 64 can be adjusted to squeeze the upstanding member 60, 62 toward each other, or can be rotated so as to relax them, thereby providing greater or lesser force opposing the arms 48, 50.

A bracket 70 is fastened to the upstanding member 60 and has one end sandwiched between the nut 68 and that member, and serves to mount therebetween a gas dryer 72. Liquid coolant is fed from an appropriate external source into the gas dryer 72 by means of the fitting 74. A stopcock 76 coarsely controls the amount of coolant passing into elbow 78, which stopcock and elbow are supported by the gas dryer 72.

A bracket 80 is fastened to the housing at one end by means of screws 82, and has horizontal and vertical sections 84 and 86 respectively. Fluid metering means, comprising a metering valve 88 (which may be a needle type valve or any substitute therefor) is fastened to vertical section 86 (by means of screws 90) and a solenoid 92 is supported by that valve. A flexible coil of tubing 94 provides the fluid connection between the elbow 78 and an elbow 96 which feeds the metering valve 88. When it is desired to cool the device 14, the cooling control means 44, receiving the appropriate signal from the temperature translating means 40, causes the solenoid 92 to actuate the metering valve 88 to allow passage of a greater or lesser amount of coolant as may be desired. The path of the coolant upon leaving the elbow 78 is through coil 94, elbow 96, metering valve 88, and the tubing 28 into the expansion chamber 26. Since coil 94 is attached at one end 98 to the member 60 which does not move upon pivotal movement of the arms 48, 50, and is fastened at its other end 100 to elbow 96 which does move upon such pivotal movement, the coil ends 98 and 100 flex vertically toward and away from each other.

The holding member 102 is adapted to engage arms 50 and thus maintain the arms 48 and 50 in their lowermost position, thereby raising housing 12 above table 16, until such time as it is desired to test the device. At such time the member 102 can be tripped, permitting the arms 48 and 50 to pivot counterclockwise as viewed in FIG. 3, thereby lowering the housing 12 until the applicator 32 engages the test device 14.

It is desirable that the heat and cold applicator 32 be capable of applying a varying pressure to the device 14 simultaneously with its varying temperature application. Accordingly, a counterweight 104 is suspended between arms 48 and 50 by means of the screws 106 passing through the slots 108 in said arms. The counterweight 104 therefore is movable along the length of the slot; the further it is moved from the housing 12, the more it will reduce the engaging force of the applicator 32 on the device 14, and the closer it is moved to the housing 12 the less it will reduce the engaging force on the device 14, that engaging force being produced by the weight of housing 12. Spring or other loading in either pivotal direction may also be provided if desired.

It is seen that the present invention provides an apparatus which can reliably apply heat and cold to a device such as a semiconductor, under test. The temperature of the applicator 32 is constantly monitored, and appropriate signals are transmitted to heating and cooling control means 42 and 44, to produce more or less heating or more or less cooling, as the case may be. The supporting structure is adapted to move the housing 12 which carries the applicator 32 toward and away from the device 14 under test, and is provided with means which concurrently controls the engaging force of that applicator on that device.

The device under test, often here referred to for explanatory purposes as a chip, may be a discrete electrical unit such as a transistor or a true integrated circuit chip, housed or packaged in any appropriate manner. The apparatus here disclosed was specifically designed for use in connection with an already packaged integrated circuit chip.

While but a single embodiment of the present invention is herein disclosed, it will be appreciated that many variations may be made in the details thereof, without departing from the spirit and scope of the invention as defined in the following claims.

I claim:

1. An apparatus for selectively applying heat and cold to a device under test, comprising a housing, a structure, means for mounting said housing on said structure for movement toward and away from an operative location where the device to be tested is adapted to be placed, said housing carrying an externally disposed heat conductive element adapted to be engaged with the device under test when said housing is moved toward said operative location, heating means on said housing in operative heat-transfer relation with said conductive element to selectively and controllably heat said conductive element, cooling means on said housing in operative heat-transfer relation with said conductive element to selectively and controllably cool said conductive element, and control means operatively connected to said heating and cooling means and effective to render one or the other of them operative, whereby heat or cold, within a preselected temperature range, can be applied, by means of said conductive element to the device under test.

2. The apparatus of claim 1, in which said housing defines a compartment therein, and said heating means comprising a heating coil received in said compartment and in operative heat-transfer relation with said conductive element.

3. In the apparatus of claim 2, said control means is operatively connected to said heating coil and effective to selectively control the heating temperature of said conductive element.

4. The apparatus of claim 1, in which said housing defines an expansion chamber therein, and said cooling means comprises fluid metering means in operative fluid connection with said expansion chamber and effective to regulate the amount of fluid coolant admitted to said expansion chamber.

5. The apparatus of claim 4, in which said control means is operatively connected to said fluid metering means and effective to selectively control the cooling temperature of said conductive element.

6. The apparatus of claim 1, said housing defining a compartment and expansion chamber therein, said heating means comprising a heating coil received in said compartment and in operative heat-transfer relation with said conductive element, said control means being operatively connected to said heating element and effective to selectively control the heating temperature of said conductive element, said cooling means comprising fluid metering means in operative fluid connection with said expansion chamber and effective to regulate the amount of fluid coolant admitted to said expansion chamber, and said control means being operatively connected to said fluid metering means, and effective to selectively control the cooling temperature of said conductive element.

7. The apparatus of claim 1, comprising heat sensing means in operative heat-transfer relation with said conductive element, operatively connected to said control means and effective to control the latter, whereby said control means, in response to said heat sensing means, controls the heating temperature of said conductive element.

8. The apparatus of claim 1, comprising heat sensing means in operative heat transfer relation with said conductive element, operatively connected to said control means and effective to control the latter, whereby said control means in response to said heat sensing means, controls the cooling temperature of said conductive element.

9. The apparatus of claim 1, comprising heat sensing means in operative heat transfer relation with said conductive element, operatively connected to said control means and effective to control the latter, whereby said control means in response to said heat sensing means, controls the heating temperature of said conductive element and the cooling temperature of said conductive element.

10. The apparatus of claim 3, comprising heat sensing means in operative heat transfer relation with said conductive element, operatively connected to said control means and effective to control the latter, whereby said control means in response to said heat sensing means, controls the heating temperature of said conductive element and the cooling temperature of said conductive element.

11. The apparatus of claim 5, comprising heat sensing means in operative heat transfer relation with said conductive element, operatively connected to said control means and effective to control the latter, whereby said control means in response to said heat sensing means, controls the heating temperature of said conductive element and the cooling temperature of said conductive element.

12. The apparatus of claim 6, comprising heat sensing means in operative heat transfer relation with said conductive element, operatively connected to said control means and effective to control the latter, whereby said control means in response to said heat sensing means, controls the heating temperature of said conductive element and the cooling temperature of said conductive element.

13. The apparatus of claim 4, in which said fluid coolant is a compressed gas which, upon admission to said expansion chamber, expands, thereby cooling said conductive element, and which gas thereafter is discharged from said expansion chamber.

14. The apparatus of claim 5, in which said fluid coolant is a compressed gas which, upon admission to said expansion chamber, expands, thereby cooling said conductive element, and which gas thereafter is discharged from said expansion chamber.

15. The apparatus of claim 6, in which said fluid coolant is a compressed gas which, upon admission to said expansion chamber, expands, thereby cooling said conductive element, and which gas thereafter is discharged from said expansion chamber.

16. The apparatus of claim 9, in which said fluid coolant is a compressed gas which, upon admission to said expansion chamber, expands, thereby cooling said conductive element, and which gas thereafter is discharged from said expansion chamber.

17. The apparatus of claim 1, which comprises means effective to regulate the engaging force of said conductive element on said test device.

18. The apparatus of claim 17, in which said regulating means comprises a counterweight movable on said structure and effective to provide a variable upward force on said conductive element, thereby to selectively control the engaging force of said conductive element on said tested device.

19. An apparatus for selectively applying heat and cold to a device under test, comprising a housing having a compartment and an expansion chamber therein, said housing carrying an externally disposed heat conductive element adapted to be engaged with the device under test, a structure on which said housing is supported for movement toward and away from the device to be tested, heating means comprising a heating coil received within said compartment and in operative heat-transfer relation with said conductive element, cooling means in operative heat transfer relation with said conductive element and comprising fluid metering means which is in operative fluid connection with said expansion chamber, control means operatively connected to said heating and cooling means and effective to render one or the other of them operative, and heat sensing means in operative heat transfer relation with said conductive element, operatively connected to said control means and effective to control the latter, whereby said control means, in response to said heat sensing means, causes said heating means or said cooling means to selectively and controllably heat or cool said conductive element within a preselected range, which heat or cold is applied to said tested device by means of said conductive element, and regulating means effective to regulate the engaging force of said conductive element on said tested device comprising a counterweight movable on said structure and effective to provide a variable upward force on said conductive element, thereby to selectively control the engaging force of said conductive element on said tested device.

* * * * *